Jan. 5, 1965 H. C. MORGAN 3,164,775
CLAMPING CIRCUIT
Original Filed Nov. 9, 1956

INVENTOR.
HARRY C. MORGAN,
BY
Allan Rothenberg
ATTORNEY 3,164,775

CLAMPING CIRCUIT

Harry C. Morgan, Woodland Hills, Calif., assignor to North American Aviation, Inc.

Original application Nov. 9, 1956, Ser. No. 621,397, now Patent No. 3,071,762, dated Jan. 1, 1963. Divided and this application Jan. 26, 1961, Ser. No. 89,601

7 Claims. (Cl. 328—98)

This invention relates to a circuit for maintaining the value of an analog signal for a desired time.

This application is a division of application Serial No. 621,397, filed November 9, 1956, now Patent No. 3,071,762.

An object of the invention is to facilitate conversion of one or more variable analog-signal quantities into digital code at very high speed.

Another object is to momentarily retain instantaneous magnitudes of a variable signal under cyclic control.

Other and further objects, features and advantages of the invention will become apparent as the description proceeds.

In carrying out the invention in accordance with a preferred form thereof a clamping circuit is arranged to receive a continually varying analog input signal and momentarily, upon occurrence of a trigger or command, provide an output indicative of the value of such analog input signal at the instant of such trigger or command. This output is maintained at such value for a relatively short period of time which may be necessary, for example, to perform conversion of the analog input signal to digital form. For this purpose there is provided a diode array with first and second resistors connecting ends of the array to points of fixed potential comprising opposite sides of a direct current source. Switches are provided for selectively transferring the input signal to the output by momentarily shunting the diode array and respective ones of the resistors upon receipt of the trigger or command pulse by the switches. An input terminal for receiving the input analog signal is connected to one terminal of the diode array. A storage condenser and other input circuitry is connected to another terminal of the diode array. During the momentary non-conduction of the switches in response to the short duration trigger pulse, the charge on the output condenser is caused to follow the value of the input signal by virtue of the connection therebetween afforded by the diode array which is conducting. Then upon removal of this momentary trigger the normally conducting switches operate to shunt the diodes and respectively shunt different ones of the resistors whereby the potential on the condenser will remain fixed until the next trigger pulse allows a charge of condenser potential to occur again.

Figure 2:
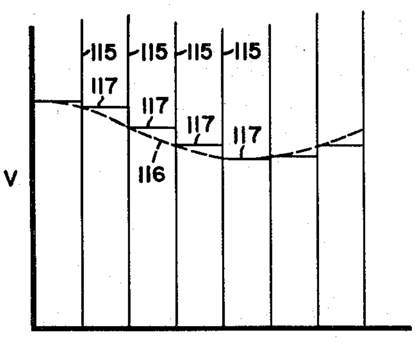
Figure 1:
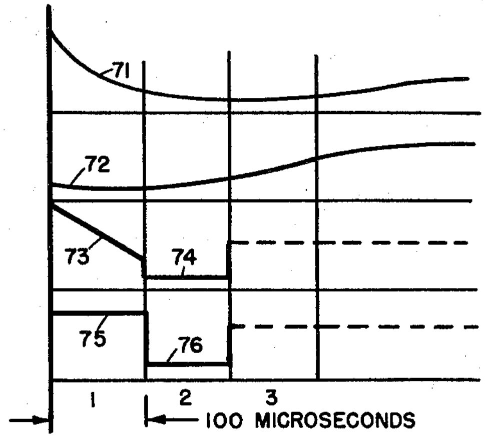
Figure 3:
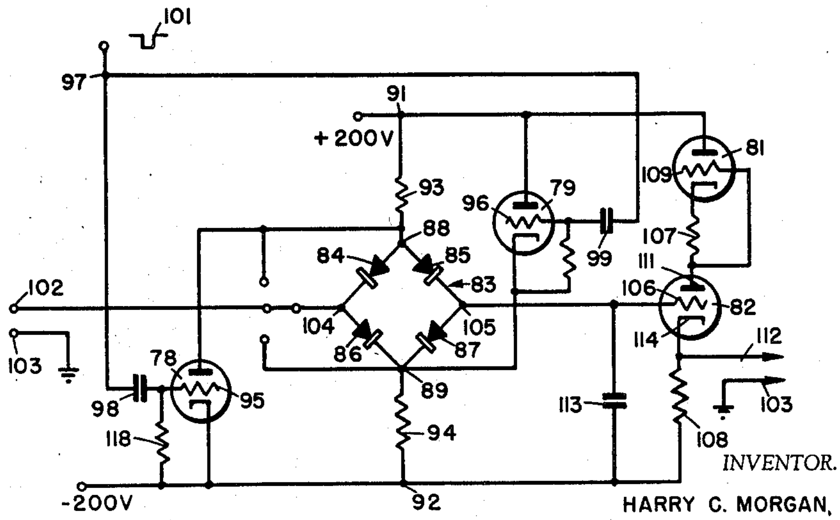

A better understanding of the invention will be afforded by the following detailed description considered in conjunction with the accompanying drawings in which FIGS. 1 and 2 are graphs illustrating operation of the recycling clamp; and FIG. 3 is a circuit diagram of the clamp.

Like reference characters are utilized throughout the drawing to designate like parts.

The function of the recycling clamp is illustrated in FIG. 1 of the drawing in which the instantaneous magnitude of another variable quantity are represented by a curve 71 and the magnitudes of another variable quantity are represented by curve 72. Sampling portions of the curves 71 and 72 are in successive time intervals, for example 100 microsecond increments of time, would result in the composite curve having segments 73 and 74.

In order that the continuously varying analog quantities represented by the curve segments 73 and 74 may be converted to digital code, the values of the curve segments 73 and 74 at some predetermined point in the curve or the average value thereof are detected and held during the period that the digital code is being produced. With the use of a recycling detector circuit of the type illustrated in FIG. 3, the initial value of the curve segment 73 is held for an increment of time, for example 100 microseconds as represented by the horizontal line 75 in FIG. 1, and the initial value of the curve 74 is held during the next 100 microseconds as represented by the horizontal line segment 76. It is to be understood that other analog quantities are detected in successive 100 microseconds time intervals.

Considering, for example, the variable quantity represented by the curve 71, a voltage corresponding thereto produced, for example, by an analog transducer (not shown) is applied to the input terminal of the recycling clamp in response to the action of a commutator under the control of a triggered sweep generator as more particularly described in the aforesaid Patent 3,071,762.

The circuit of FIG. 3 comprises a pair of switching tubes 78 and 79 shown as triodes which may constitute two halves of a twin triode tube, a cascode cathode follower comprising triode elements 81 and 82 which may be parts of a twin triode, and a diode array 83 which may consist either of thermionic discharge elements or semiconductors, for example, silicone diodes. As shown, the diode array 83 comprises four diodes 84, 85, 86 and 87 connected as a bridge with polarity such that positive current flows from a terminal 88 to a terminal 89. The terminals 88 and 89 are connected to a positive power supply terminal 91 and a negative power supply terminal 92 through resistors 93 and 94, respectively.

The switching tube 78 is connected between the terminals 88 and 92 so as to bypass the diode array 83 and the diode resistor 94; whereas the switching tube 79 is connected between the terminals 91 and 89 so as to bypass the diode resistor 93 and the diode array 83. The switching tubes 78 and 79 have control electrodes or grids 95 and 96, respectively. The control elements 95 and 96 are coupled to a gate terminal 97 through coupling condensers 98 and 99. A triggered sweep generator (not shown) is arranged to supply a negative trigger pulse 101 to the gate terminal 97.

Input terminals 102 and 103 are provided at which the analog input signal from the commutator (not shown) or an analog transducer (not shown) is supplied. As shown, the analog input terminal 103 is grounded and the analog input terminal 102 is connected to the diode array 83. For example, where a four-diode bridge array is employed, the terminal 102 may be connected to a junction terminal 104 of the diode array 83. In this arrangement, a second diode array junction terminal 105 is connected to a control electrode 106 of the cascode cathode follower tube 82.

In the cascode cathode follower, the tubes 81 and 82 are connected in series between the positive power supply terminal 91 and the negative terminal 92. There is a cathode resistor 107 connected in the cathode line of the tube 81 to the anode line of the tube 82 and the tube 82 is provided with a cathode resistor 108. The tube 81 has a control electrode 109 connected to the anode 111 of the tube 82 for stabilizing the tube 81. An output terminal 112 is connected to the cathode 114 of the tube 82, and the ground terminal 103 serves as a second output terminal.

The cascode follower tubes 81 and 82 provide a high degree of stability by reason of the feedback employed.

The clamping circuit of FIG. 3 operates in the following manner: when there is no signal applied to the input terminals 102 and 103 the switching tubes 78 and 79 are heavily conducting, pulling the potential of the diode array terminal 88 well below that of the diode array terminal 89. Consequently, the diodes 84 to 87 are cut off and a charge upon a storage condenser 113 is isolated. Since the charge upon the condenser 113 controls the potential of the cascode cathode follower control electrode 106, it determines the voltage output at the terminals 112 and 103.

However, when the brief strong negative pulse 101 is applied to the grids 95 and 96 of the switching tubes 78 and 79, they are cut off or rendered nonconducting. The voltage at this time is determined by the voltage drops across the resistors 93 and 94, and the diodes 84 to 87, which have become conducting, and the voltage is also modified by the analog signal at the input terminal 102 which is connected to the junction 104 of the diode array 83. Consequently, the voltage at the junction terminal 105 and therefore at the output terminal 112 will rise and fall with the input signal.

The function of the recycling clamp of FIG. 3 is illustrated in FIG. 2 in which the vertical lines 115 represent the times at which the switching tubes 78 and 79 are rendered nonconducting. The dotted curve 116 represents the analog signal curve. The analog value is read into the clamp of FIG. 3 at each of the instants represented by vertical lines 115 as shown by horizontal lines and line segments 117. The value of the output voltage is preserved at points between read-out by the storage condenser 113 of FIG. 3.

The full four-diode bridge array 83 of FIG. 3 provides cathode hum balance as well as cancelling out the effect of diode contact potentials and their variations with changing heater voltage if thermionic valves are employed. However, it is unnecessary to employ a four-diode array when silicone diodes are employed. For example, the diodes 84 and 86 may be omitted, in which case the input terminal 102 may be connected either to the terminal 88 or to the terminal 89.

For simplicity, if desired, the cathode follower 81 may also be omitted with the anode 111 of the tube 82 connected directly to the power supply terminal 91 so as to employ a simple cathode follower output stage.

An important factor to be taken into account is the selection of the diodes and the condenser 113. After diode conduction, current carriers are left over which briefly (order of 1 microsecond or less) permit negative current conduction. In order to avoid any possibility of this effect causing an error in the charge left on the condensers 113, the diodes are carefully matched for the negative conduction effect so as to minimize the error. The accuracy of the operation is least affected by input impedance when the terminal 88 (assuming connection there of the analog input terminal 102), is balanced to ground potential.

The invention is not limited to the use of any particular constants or tubes. However, satisfactory operation is obtained where the switching tubes 78 and 79 are elements of a type 5687 twin triode and the diodes 84–87 are of the 1N214 type with 200 volt positive power supply for the terminal 91, and 200 volt negative power supply at the terminal 92, the resistors 93 and 94 constituting 66,000 ohm resistors and the resistor 118 constituting a 1,000 ohm resistor. In the simplified circuit, with only two triodes the resistor 93 may be 133,000 ohm, resistor 94 may be 30,000 ohm, and the negative power supply voltage of the terminal 92 may be minus 30 volts.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a diode array, resistors in series with the array at each end, for connection to a current source, an electronic switch across the array and one resistor, a second electronic switch across the array and the other resistor, means for simultaneously operating both switches to non-conduction, an input signal terminal connected to the array, and a condenser connected to the array and an end of one of the resistors, for storing the input signal magnitude between switch operations.

2. A recycling clamp comprising in combination, a pair of switching tubes, a cascode cathode follower, a diode array comprising four diodes connected as a bridge, direct current power supply terminals with resistors interposed between the terminals and the diode array, the diode array having an intermediate terminal for receiving analog input signals, the cascode cathode follower having a control electrode, the diode array also having an intermediate terminal connected to said control electrode, the first switching tube having a control electrode for response to trigger pulses and being connected across one of said resistors and the diode array, the second switching tube having a control electrode connected to the control electrode of the first switching tube and being connected across the other of said resistors and the diode array whereby a clamped voltage appears as an output from the cathode follower.

3. A recycling clamp comprising in combination input terminals for receiving an analog signal, output terminals for supplying a clamped signal value corresponding to an instantaneous value of the analog signal, first and second direct current supply terminals, serially connected diode means having first and second terminals and intermediate terminal means, a first resistor connected between the first direct current supply terminal and the first diode means terminal, a second resistor connected between the second diode means terminal and the second direct current supply terminal, a switching tube having a current conducting electrode connected to the first diode means terminal, a current conducting electrode connected to the second resistor, and a control electrode, a second switching tube having a current conducting electrode connected to the first resistor, a current conducting electrode connected to the second diode means terminal and a control electrode, a terminal for receiving trigger impulses coupled to said control electrodes, cathode follower means connected to the first and second resistors having a control electrode and having a cathode resistor connected to the said output terminals, the control electrode of said cathode follower means being connected to intermediate terminal means of the diode means and the analog input terminal being connected to intermediate terminal means of the diode means.

4. A recycling clamp comprising in combination input terminals for receiving an analog signal, output terminals for supplying a clamped signal value corresponding to an instantaneous value of the analog signal, first and second direct current supply terminals, serially connected diode means having first and second terminals and intermediate terminal means, a first resistor connected between the first direct current supply terminal and the first diode means terminal, a second resistor connected between the second diode means terminal and the second direct current supply terminal, a switching tube having a current conducting electrode connected to the first diode means terminal, a current conducting electrode connected to the second resistor and having a control electrode, a second switching tube having a current conducting electrode connected to the first resistor, a current conducting electrode connected to the second diode means terminal and a control electrode, a terminal for receiving trigger impulses coupled to said control electrodes, cathode follower means connected to the first and second resistors having a control electrode and having a cathode resistor connected to the said output terminals, the control electrode of said cathode follower means being connected to intermediate terminal means of the diode means and the analog input terminals being coupled to one of the terminals of the diode means.

5. A recycling clamp comprising in combination input terminals for receiving an analog signal, output terminals for supplying a clamped signal value corresponding to an instantaneous value of the analog signal, first and second direct current supply terminals, serially connected diode means having first and second terminals and intermediate terminal means, a first resistor connected between the first direct current supply terminal and the first diode means terminal, a second resistor connected between the second diode means terminal and the second direct current supply terminal, a switching tube having a current conducting electrode connected to the first diode means terminal, a current conducting electrode connected to the second resistor, and a control electrode, a second switching tube having a current conducting electrode connected to the first resistor, a current conducting electrode connected to the second diode means terminal and a control electrode, a terminal for receiving trigger impulses coupled to said control electrodes, cathode follower means connected to the first and second resistors having a control electrode and having a cathode resistor connected to the said output terminals, the control electrode of said cathode follower means being connected to one of the terminals of the diode means.

6. A recycling clamp comprising in combination input terminals for receiving an analog signal, output terminals for supplying a clamped signal value corresponding to an instantaneous value of the analog signal, first and second direct current supply terminals, serially connected diode means having terminals comprising first and second terminals and intermediate terminal means, a first resistor connected between the first direct current supply terminal and the first diode means terminal, a second resistor connected between the second diode means terminal and the second direct current supply terminal, a switching tube having a current conducting electrode connected to one of first and second diode means terminals, a current conducting electrode connected to one of the resistors and having a control electrode, terminal means for receiving trigger impulses coupled to said control electrode, coupling means between the said output terminals, and one of the terminals of the diode means, and the analog input terminals being coupled to one of the other terminals of the diode means.

7. A clamping circuit comprising
a diode array,
first and second resistors connecting respective ends of the array to first and second points of fixed potential,
a condenser connected to said array and to one of said resistors for providing an output signal,
an input signal terminal connected to the array, and
means for causing the signal on the condenser to momentarily follow a signal on the input terminal comprising first switch means for selectively shunting said array and said first resistor, second switch means for selectively shunting said array and said second resistor, and means for simultaneously and momentarily operating both said switches to shunt both resistors and said array.

References Cited in the file of this patent

UNITED STATES PATENTS

| | | |
|---|---|---|
| 2,438,947 | Rieke et al. | Apr. 6, 1948 |
| 2,443,195 | Pensyl | June 15, 1948 |
| 2,990,477 | MacIntyre | June 27, 1961 |